US011375365B1

(12) United States Patent
Karpoor et al.

(10) Patent No.: US 11,375,365 B1
(45) Date of Patent: Jun. 28, 2022

(54) ACTIVATION OF A RADIO DEVICE FOR CUSTOMER USE

(71) Applicant: MOTOROLA SOLUTIONS, INC., Chicago, IL (US)

(72) Inventors: Sanjaykumar S. Karpoor, Buffalo Grove, IL (US); Alan P. Alvarez, Schaumburg, IL (US); Jeevanram M. Nattami, Palatine, IL (US); Yew Tatt Sim, Pengang (MY); Daniel P. Zetzl, Bartlett, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 42 days.

(21) Appl. No.: 17/115,541

(22) Filed: Dec. 8, 2020

(51) Int. Cl.
*H04W 8/04* (2009.01)
*H04W 8/26* (2009.01)
*H04W 48/04* (2009.01)
*H04W 8/12* (2009.01)

(52) U.S. Cl.
CPC ............ *H04W 8/265* (2013.01); *H04W 8/04* (2013.01); *H04W 8/12* (2013.01); *H04W 48/04* (2013.01)

(58) Field of Classification Search
CPC .................................. H04W 8/02; H04W 8/04
See application file for complete search history.

(56) References Cited

U.S. PATENT DOCUMENTS

| | | | |
|---|---|---|---|
| 7,110,127 B2 | 9/2006 | Walker et al. | |
| 7,668,761 B2 | 2/2010 | Jenkins et al. | |
| 8,721,426 B2 * | 5/2014 | Nicely | G07F 17/326 463/20 |
| 9,838,250 B1 | 12/2017 | Wajahat | |
| 10,033,853 B2 * | 7/2018 | Ahn | H04M 1/72457 |
| RE47,297 E | 3/2019 | Parry et al. | |
| 10,306,400 B2 | 5/2019 | Erickson et al. | |
| 10,567,225 B2 | 2/2020 | Naiden et al. | |
| 2007/0214368 A1 * | 9/2007 | Ota | G08C 23/04 713/189 |

FOREIGN PATENT DOCUMENTS

CA          2793266 C       4/2017

OTHER PUBLICATIONS

International Search Report and Written Opinion for Application No. PCT/US2021/072353 dated Feb. 23, 2022 (14 pages).

* cited by examiner

*Primary Examiner* — Michael T Vu
(74) *Attorney, Agent, or Firm* — Michael Best & Friedrich LLP (57) ABSTRACT

One example device facilitates activation of a radio device includes an electronic processor configured to select the radio device from a plurality of types of unactivated radio devices. Each radio device of the plurality of types of unactivated radio devices may be factory loaded with a global firmware and a global codeplug. The electronic computing device may be configured to determine at least one of a region-specific codeplug version and a region-specific regulatory restriction based on a desired region of operation, and associate the at least one of the region-specific codeplug version and the region-specific regulatory restriction with a unique identifier of the radio device that are configured to be transmitted to the radio device to activate the radio device for communication within the region of operation in response to receiving an indication that the radio device has been powered-up for a first time for operation by a customer.

20 Claims, 5 Drawing Sheets

ACTIVATION OF A RADIO DEVICE FOR CUSTOMER USE

BACKGROUND OF THE INVENTION

Radio device manufacturers may manufacture many different types of radio devices for use by different customers with different needs. Manufacturers may also manufacture different types of radio devices for use by different customers located in different regions of the world. These different regions may have, for example, different regulatory requirements regarding operation of radio devices. These different types of radio devices may include different types of hardware components and software components that provide different functionality to meet the demands of different users and the requirements of different geographical regions.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As explained above, different types of radio devices may include different types of hardware components and/or software components that provide for at least some difference in functionality between the different types of radio devices. Each of these different types of radio devices may satisfy the needs and/or regional regulatory requirements of different customers.

Radio device manufacturers often manufacture a different type of radio device to correspond to each customer need and/or set of regional regulatory requirements (for example, for each combination of hardware components and software (for example, firmware) components desired by a number of different customers or required by the regulations of different countries). Radio device manufacturers may fulfill requested hardware and software specifications at the time of manufacture. For example, radio device manufacturers may program different types of specified software into different types of radio devices at the time of manufacturing the radio devices. However, such fulfillment during the manufacturing process results in a large number of stock-keeping units (SKUs) because each different combination of hardware and/or software results in a different SKU. This large number of SKUs often makes it difficult to accurately predict a number of radio devices of each SKU that should be manufactured to meet the needs of different customers in different regions. For example, a radio device of a first SKU may meet the needs of a first customer but may not meet the needs of a second customer. Thus, if there is a surplus of radio devices of the first SKU and a shortage of radio devices of a second SKU desired by a second customer, the surplus of radio devices of the first SKU may be unable to be used to satisfy the shortage of radio devices of the second SKU. Thus, the surplus of radio devices of the first SKU may be wasted while the radio device manufacturer may still have to manufacture additional radio devices of the second SKU to satisfy the shortage.

Along similar lines, reprogramming some of the radio devices of the first SKU to instead be radio devices of the second SKU may result in the use of additional programming devices/techniques beyond those required for initial programming of a radio device. For example, deleting or overwriting previously-programmed portions of a memory of the radio device may be required while reprogramming a radio device. Additionally, reprogramming of radio devices may result in programming errors that negatively affect the functionality of the reprogrammed radio devices (for example, if previously-programmed portions of the memory are not properly deleted or overwritten).

Additionally, software fulfillment during the manufacturing process may make radio devices less flexible with respect to changing customer needs and/or changing regulatory requirements. For example, if customer needs and/or regulatory requirements change after a customer acquires a radio device, the customer may be required to take the radio device to a service center in order to have the software/firmware updated according to the new needs and/or regulatory requirements. Such an update process is inconvenient and may cause the radio device to operate less efficiently until the software update is received.

Accordingly, there are numerous technological problems with current software/firmware fulfillment methods used during the manufacturing process of radio devices. For example, these technological problems include radio device inventory management problems and problems regarding software/firmware updates for radio devices that allow the radio devices to improve their functionality and/or function according to changing customer needs and/or changing regulatory requirements.

To address these technological problems, disclosed are, among other things, methods, devices, and systems to activate a radio device for customer use without fulfilling at least some of the software/firmware specifications of the radio device during the manufacturing process (i.e., without fulfilling at least some of the software/firmware specifications of the radio device before the radio device has been powered-up for a first time for operation by a customer). For example, a radio device may be selected from a plurality of types of unactivated radio devices that is each factory loaded with a global firmware and a global codeplug. A unique identifier of the selected radio device may be associated with region specific information of the customer. The association of the unique identifier and the region specific information may be transmitted to a radio management server or a customer server. Upon being powered-up (i.e., turned on) for a first time by the customer, the radio device may communicate with the radio management server or the customer server to receive the region specific information and configure itself for operation accordingly.

In contrast to performing software/firmware fulfillment at the time of manufacturing (i.e., before the radio device being powered-up for the first time by the customer), this process results in at least some software/firmware fulfillment when the customer powers-up the radio device (in other words, edge-based software/firmware fulfillment). Such software fulfillment addresses the above-noted technological problems by allowing radio manufacturers to reduce a number of SKUs used for different types of radio devices. For example, three different previous radio device SKUs that were only different due to software differences (i.e., same hardware in each radio device) may be reduced to a single SKU where each radio device receives region specific information regarding software specifications when the customer first powers-up the radio device.

This reduction in SKUs results less inventory predictions needing to be made in individual markets/regions because the same SKU (i.e., radio devices 105 with identical hardware components) may be used across different markets/regions with different software specifications. Thus, with reference to the example provided previously herein, a surplus of radio devices in one region may be used to satisfy a shortage of radio devices in another region as long as the hardware components of each type of radio device are the same. Any differences in software specifications are not relevant to inventory predictions and inventory management because the software specifications will be transmitted to the radio devices after purchase upon the customer receiving the radio devices and powering-up the radio devices. In other words, the reduction in SKUs that is possible as a result of the systems, devices, and methods disclosed herein allows for inventory flexibility that results in cost savings during the manufacturing process.

Additionally, the interchangeable use of radio devices to satisfy different orders reduces or eliminates reprogramming of radio devices after the radio devices have initially been programmed to function for a certain customer or in a certain region. Accordingly, the technological problems explained previously herein with respect to reprogramming of radio devices are reduced or eliminated.

Additionally, the edge-based software fulfillment addresses the technological problem related to software updates because the radio management server or the customer server may be updated to reflect changing customer needs and/or changing regulatory requirements. These changes may then be pushed to the radio devices by the radio management server or the customer server in the form of software updates. In other words, these changes do not need to be made at each radio device individually at a service center, which results in improved convenience to the customer and in the radio devices operating more efficiently for longer periods of time.

One embodiment provides an electronic computing device configured to facilitate activation of a radio device. The electronic computing device may include a network interface, and an electronic processor coupled to the network interface. The electronic processor may be configured to receive a communication identifying a hardware capability, a software option, and a region of operation. The electronic computing device may be further configured to select the radio device from a plurality of types of unactivated radio devices based on the hardware capability, the software option, and the region of operation. Each radio device of the plurality of types of unactivated radio devices may be factory loaded with a global firmware and a global codeplug. The electronic computing device may be further configured to determine at least one of a region-specific codeplug version and a region-specific regulatory restriction based on the region of operation included in the communication. The electronic computing device may be further configured to associate the at least one of the region-specific codeplug version and the region-specific regulatory restriction with a unique identifier of the radio device. The at least one of the region-specific codeplug version and the region-specific regulatory restriction may be configured to be transmitted to the radio device to activate the radio device for communication within the region of operation in response to receiving an indication that the radio device has been powered-up for a first time for operation by a customer.

Another embodiment provides a method of activating a radio device for customer use. The method may include receiving, with an electronic processor of an electronic computing device and via a network interface of the electronic computing device, a communication identifying a hardware capability, a software option, and a region of operation. The method may further include selecting, with the electronic processor, the radio device from a plurality of types of unactivated radio devices based on the hardware capability, the software option, and the region of operation. Each radio device of the plurality of types of unactivated radio devices may be factory loaded with a global firmware and a global codeplug. The method may further include determining, with the electronic processor, at least one of a region-specific codeplug version and a region-specific regulatory restriction based on the region of operation included in the communication. The method may further include associating, with the electronic processor, the at least one of the region-specific codeplug version and the region-specific regulatory restriction with a unique identifier of the radio device. The at least one of the region-specific codeplug version and the region-specific regulatory restriction may be configured to be transmitted to the radio device to activate the radio device for communication within the region of operation in response to receiving an indication that the radio device has been powered-up for a first time for operation by a customer.

Another embodiment provides a radio device activation system that may include a radio management server including a first electronic processor and a first network interface. The radio device activation system may also include an electronic computing device communicatively coupled to the radio management server, and including a second electronic processor and a second network interface. The second electronic processor may be configured to receive a communication identifying a hardware capability, a software option, and a region of operation. The second electronic processor may be further configured to select a radio device from a plurality of types of unactivated radio devices based on the hardware capability, the software option, and the region of operation. Each radio device of the plurality of types of unactivated radio devices may be factory loaded with a global firmware and a global codeplug. The second electronic processor may be further configured to determine at least one of a region-specific codeplug version and a region-specific regulatory restriction based on the region of operation included in the communication. The second electronic processor may be further configured to transmit, via the second network interface to the radio management server, information linking a unique identifier of the radio device with the at least one of the region-specific codeplug version and the region-specific regulatory restriction. The first electronic processor of the radio management server may be configured to receive, via the first network interface and from the electronic computing device, the information linking the unique identifier of the radio device with the at least one of the region-specific codeplug version and the region-specific regulatory restriction. The first electronic processor may be further configured to receive, via the first network interface and from the radio device, an indication that the radio device has been powered-up for a first time for operation by a customer. The first electronic processor may be further configured to, in response to receiving the indication that the radio device has been powered-up for the first time for operation by the customer, activate the radio device for communication within the region of operation by transmitting, via the first network interface, the at least one of the region-specific codeplug version and the region-specific regulatory restriction to the radio device.

Another embodiment provides a radio device that may include a transceiver and an electronic processor operably coupled to the transceiver. The electronic processor may be configured to transmit, to a first server, an indication that the radio device has been powered-up for a first time for operation by a customer. The electronic processor may be further configured to receive, from the first server, an address of a second server. The second server may include a region-specific codeplug having region-specific regulatory restrictions embedded therein. The electronic processor may be further configured to transmit, to the second server, a connection request to obtain the region-specific codeplug having the region-specific regulatory restrictions embedded therein. The electronic processor may be further configured to activate the radio device for communication using the region-specific codeplug having the region-specific regulatory restrictions embedded therein.

For ease of description, some or all of the example systems and devices presented herein are illustrated with a single example of each of its component parts. Some examples may not describe or illustrate all components of the systems or devices. Other example embodiments may include more or fewer of each of the illustrated components, may combine some components, or may include additional or alternative components.

Figure 1:
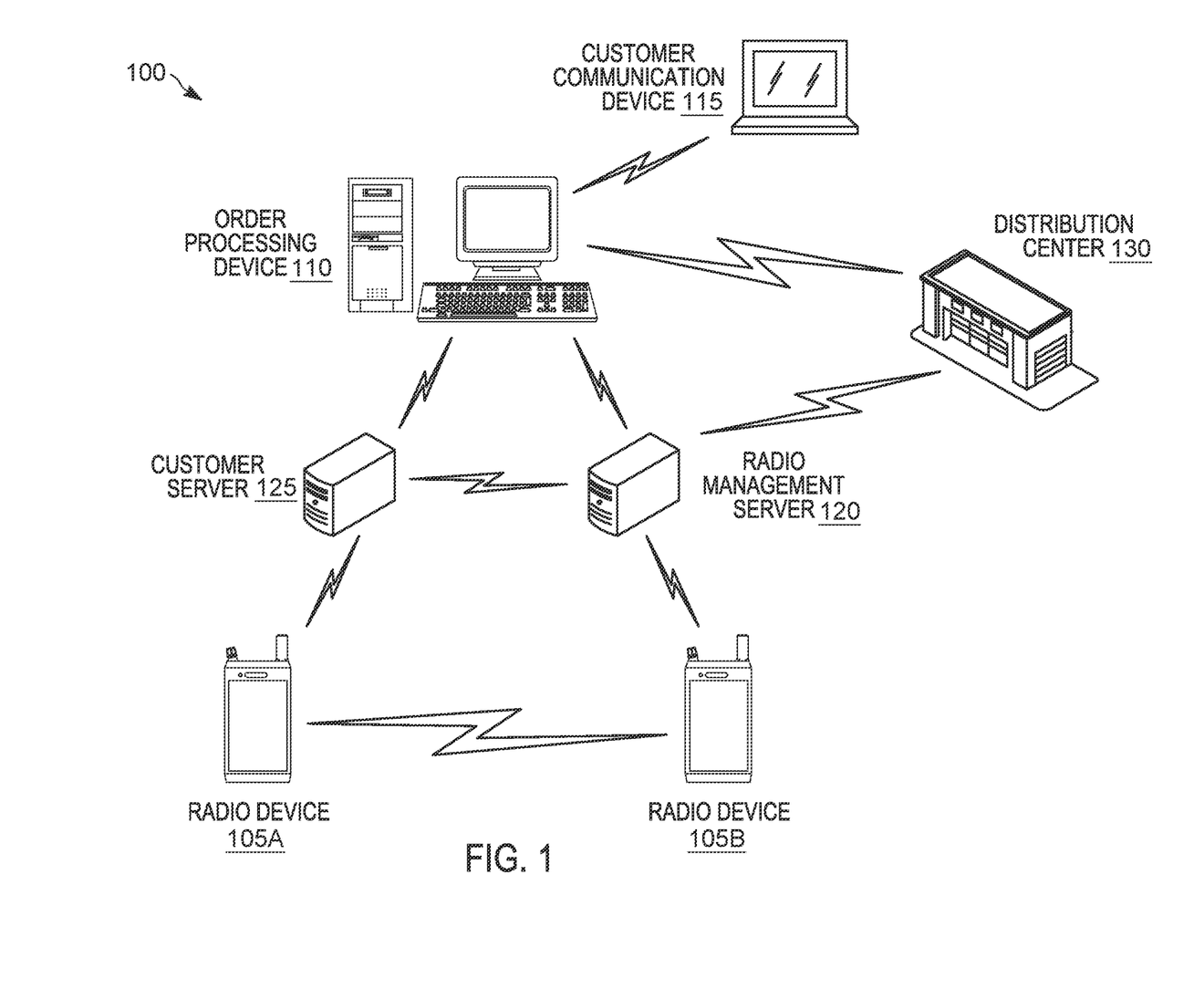
FIG. 1 is a diagram of a communication system according to one example embodiment.

FIG. 1 is a diagram of a communication system 100 according to one example embodiment. In the example illustrated, the communication system 100 includes radio devices 105A and 105B. In the following description, when explaining how a single radio device functions, a reference to radio device 105 is used. It is not necessary, however, that the radio devices 105A and 105B are identical. The radio devices 105A and 105B are merely examples. In some embodiments, the communication system 100 may include more or fewer radio devices 105 than illustrated in FIG. 1.

In some embodiments, the radio devices 105 communicate with each other over a communication network including one or more radio frequency (RF) site controllers, base stations, or the like (for example, by sending and receiving radio signals to and from an RF site controller, a base station, or the like). The communication network may include wireless and wired portions. All or parts of the communication network may be implemented using various existing specifications or protocols. In some embodiments, the communication network is implemented using a direct-mode, conventional, or trunked land mobile radio (LMR) standard or protocol, for example, European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the communication network implements the Long Term Evolution (LTE) (including LTE-Advanced or LTE-Advanced Pro compliant with, for example, the 3GPP TS 36 specification series), or the 5G (including a network architecture compliant with, for example, the 3GPP TS 23 specification series and a new radio (NR) air interface compliant with the 3GPP TS 38 specification series) standard, among other possibilities, and over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), or a PTT over IP (PoIP) application may be implemented. The communication network may also include future developed networks. In some embodiments, the communication network may also include a combination of the networks mentioned. As indicated in FIG. 1, in some embodiments, the radio devices 105 may communicate directly with each other using a communication channel or connection that is outside of the communication network. For example, as indicated in FIG. 1, the radio devices 105A and 105B may communicate directly with each other when they are within a predetermined distance from each other using short-range communication mechanisms such as Bluetooth® links.

In some embodiments, the communication system 100 includes an order processing device 110 (i.e., order processing server 110). The order processing device 110 also may be referred to as an electronic computing device 110. The order processing device 110 may be operated and maintained by a radio device manufacturer that manufactures radio devices 105. The order processing device 110 may receive a communication (i.e., an order such as purchase order) regarding one or more radio devices 105 desired by a customer. For example, the order processing device 110 may receive the order via a user input from an employee of the radio device manufacturer (e.g., via a keyboard, mouse, touchscreen, or the like) that received the order from an employee of the customer. As another example, the order processing device 110 may receive an order by communicating with a customer communication device 115 over a communication network such as the communication network described previously herein. Although the customer communication device 115 is shown as a separate device than the radio devices 105, in some embodiments, the customer communication device 115 may be embodied as a radio device 105. In some embodiments, the customer is a company (e.g., a security company), an agency (e.g., a public safety agency such as a police department, a fire department, or the like), or another entity and may include employees of the company agency, or another entity.

The order processing device 110 may communicate (for example, over the communication network described previously herein) with at least one of a radio management server 120 and a customer server 125. In some embodiments, the radio management server 120 is operated and maintained by the radio device manufacturer and may be configured to store configuration information for different types of radio devices 105. The customer server 125 may also be configured to store configuration for different types of radio device 105. However, the customer server 125 may be operated and maintained by the customer rather than by the radio device manufacturer. As indicated in FIG. 1, each of the radio management server 120 and the customer server 125 may be configured to communicate with one or more radio devices 105 (for example, over the communication network described previously herein). Additionally, the radio management server 120 and the customer server 125 may be configured to communicate with each other (for example, over the communication network described previously herein).

As illustrated in FIG. 1, the radio device 105 may be a handheld communication device, for example, a mobile telephone or other portable communication device, mobile radio, laptop computer, tablet computer, smart watch or other smart wearable, and may be located in or be a part of a drone or unmanned aerial vehicle, or may be another device configured to communicate over the communication network described previously herein. In some embodiments, the radio device 105 may be a handheld radio carried by a public safety officer or first responder, such as a police officer. In some embodiments, the radio device 105 may be a mobile communication device mounted in or on a vehicle (for example, a police vehicle, an ambulance, or the like). In some embodiments, the radio device 105 may be a device maintained, for example, at a call center or public safety command center (for example, a desktop computer).

In some embodiments, the order processing device 110 is a similar device as the radio device 105. For example, the order processing device 110 may include a desktop computer that includes a user input (e.g., a keyboard and mouse) and a display. In some embodiments, the order processing device 110 is an order processing server 110 that may not include one or both of the user input or the display.

In some embodiments, the order processing device 110 is configured to communicate with a communication device (e.g., that is similar to the radio devices 105) and/or server located in a distribution center 130 (for example, over the communication network described previously herein). In some embodiments, the distribution center 130 is owned and/or operated by a radio device manufacturer. In some embodiments, at least some of the manufacturing process of the radio devices 105 occurs at the distribution center 130.

FIG. 1 illustrates only one example embodiment of the communication system 100. In other embodiments, the system 100 may include more or fewer components and may perform functions that are not explicitly described herein. For example, the communication system 100 may include additional radio devices, radio management servers, and customer servers 125. Further, in some embodiments, one or more devices of the system communication system 100 are combined into a single device. For example, the order processing device 110 and the radio management server 120 may be combined into a single device that performs the functions of both devices that are described herein and that may be referred to as an electronic computing device.

Figure 2:
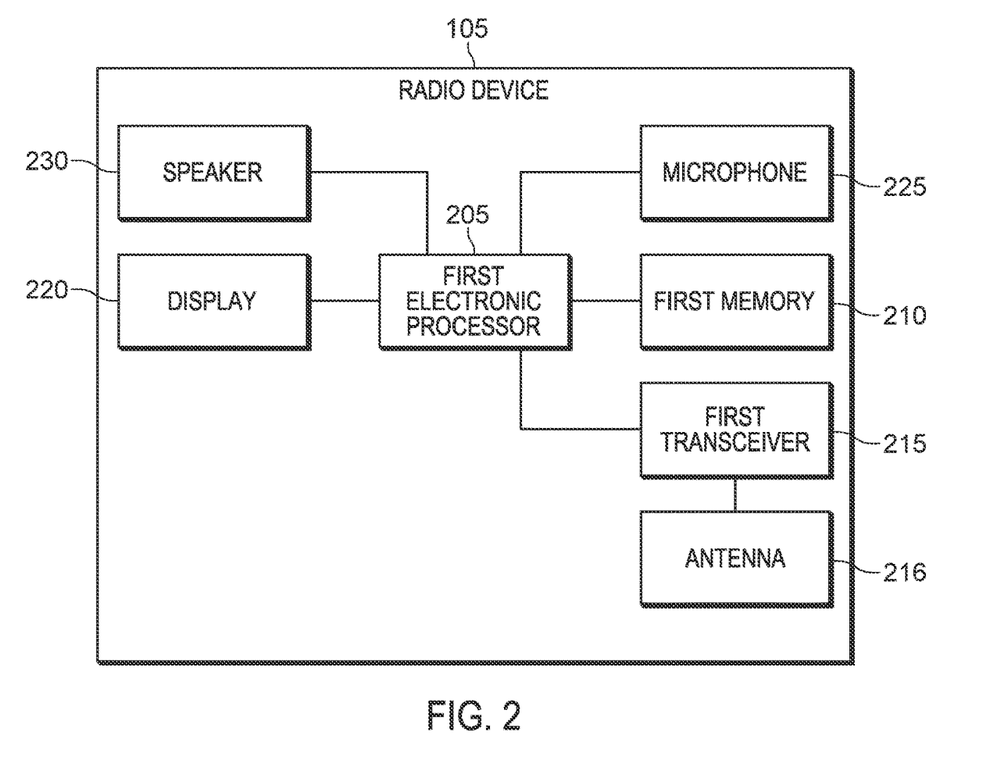
FIG. 2 is a diagram of a radio device included in the communication system of FIG. 1 according to one example embodiment.

FIG. 2 is a block diagram of a radio device 105 of the communication system 100 according to one example embodiment. In the example shown, the radio device 105 includes a first electronic processor 205 (for example, a microprocessor or another electronic device). The first electronic processor 205 may include input and output interfaces (not shown) and be electrically connected to a first memory 210, a first transceiver 215 including or connected to an antenna 216 (the combination of which may be referred to as a first network interface), a display 220, a microphone 225, and a speaker 230.

The first memory 210 includes read only memory (ROM), random access memory (RAM), other non-transitory computer-readable media, or a combination thereof. The first electronic processor 205 is configured to receive instructions and data from the first memory 210 and execute, among other things, the instructions. In particular, the first electronic processor 205 executes instructions stored in the first memory 210 to perform at least some of the methods described herein.

Depending on a type of radio device 105 ordered by a customer, the first memory 210 may be programmed to include different software/firmware options that are executable by the first electronic processor 205. In some embodiments, regardless of the type of radio device 105, the first memory 210 includes a global firmware and a global codeplug. In some embodiments, the global firmware and the global codeplug instruct the first electronic processor 205 to interface with a mobile application programming interface (API) to transmit an indication that the radio device 105 has been powered-up for the first time for operation by the customer as explained in greater detail herein.

The combination of the first transceiver 215 and the antenna 216 (i.e., the first network interface) sends and receives data to and from other devices in the communication system 100 (for example, over the communication network described previously herein). For example, the first transceiver 215 is a wireless communication transceiver for wirelessly communicating with other devices. Alternatively or in addition, the first network interface may include a connector or port for receiving a wired connection to the communication network, such as an Ethernet cable. The first electronic processor 205 receives electrical signals representing sound from the microphone 225 and may communicate information relating to the electrical signals to other devices through the first transceiver 215 and the antenna 216 (for example, to another radio device 105). Similarly, the first electronic processor 205 may output data received via the first network interface, for example from another radio device 105, through the speaker 230, the display 220, or a combination thereof.

In some embodiments, the radio device 105 may include fewer or additional components in configurations different from that illustrated in FIG. 2. For example, in some embodiments, the radio device 105 also includes one or more of a camera, a location component (for example, a global positioning system (GPS) receiver), and a push-to-talk (PTT) mechanism/button. In some embodiments, the radio device 105 performs additional functionality than the functionality described below.

Similar to the software/firmware options described previously herein, depending on a type of radio device 105 ordered by a customer, the radio device 105 may be manufactured to include different hardware components. For example, the radio device 105 may include a camera or GPS receiver as noted above. As another example, the radio device 105 may include additional or different first transceivers 215 and/or antennas 216 (i.e., additional or different network interfaces). For example, a network interface of a first type of radio device 105 may include a land mobile radio (LMR) integrated circuit (IC) and a Long Term Evolution (LTE) integrated circuit while a network interface of a second type of radio device 105 may include a LMR integrated circuit and a Wi-Fi integrated circuit. In this example, the network interfaces of different types of radio devices 105 may be configured to communicate using at least some different communication protocols. As another example, a network interface of a third type of radio device 105 may include an LTE integrated circuit configured to communicate over a first frequency band while a network interface of a fourth type of radio device 105 may include an LTE integrated circuit configured to communicate over a second frequency band different than the first frequency band. In this example, the network interfaces of different types of radio devices 105 may be configured according to different settings of the same communication protocol. Other examples of different hardware components between different types of radio devices 105 include different filters, different power amplifiers, other different devices that operate in conjunction with different network interfaces, and the like.

Additionally, different software/firmware options (e.g., modem configuration) may be included in the first memory 210 of the radio device 105 depending on the hardware components included in each type of radio device 105. For example, certain hardware components may be associated with certain software/firmware options that allow the hardware components to function. For example, additional firmware options and/or software options may be stored in the first memory 210 of radio devices 105 that include a camera or GPS receiver. As another example, different firmware options and/or software options may be used to control the same hardware component differently. Referring to the previous example related to network interfaces configured according to different settings of the same communication protocol, different firmware options and/or software options may cause the same type of hardware component (e.g., an LTE integrated circuit in each radio device 105) to function differently (e.g., wirelessly communicate with other devices using different frequency bands). As another example, the firmware options and/or software options may prevent or allow the radio device 105 from engaging in digital communication or analog communication, for example, by only allowing one or the other.

Figure 3:
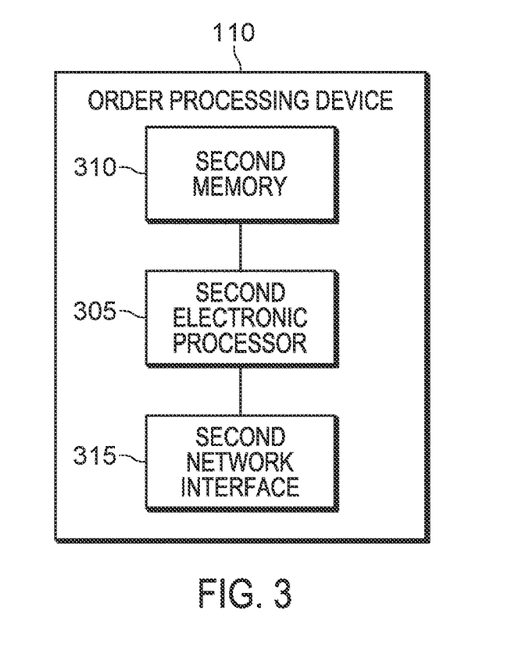
FIG. 3 is a diagram of an order processing device included in the communication system of FIG. 1 according to one example embodiment.

FIG. 3 is a block diagram of the order processing device 110 according to one example embodiment. In the example illustrated, the order processing device 110 is a computer that includes a second electronic processor 305, an input/output interface (not shown), a second memory 310, and a second network interface 315 (for example, including a transceiver and an antenna). These components are similar to those described above with respect to the radio device 105 and perform similar general functions. In some embodiments, the order processing device 110 may include fewer or additional components in configurations different from that illustrated in FIG. 3. For example, in some embodiments, the order processing device 110 also includes a display and/or a microphone similar to that described above with respect to the radio device 105. In some embodiments, the order processing device 110 performs additional functionality than the functionality described herein. In some embodiments, the order processing device 110 communicates with other devices of the communication system 100 to control and/or influence operation thereof as explained in greater detail below.

Figure 4:
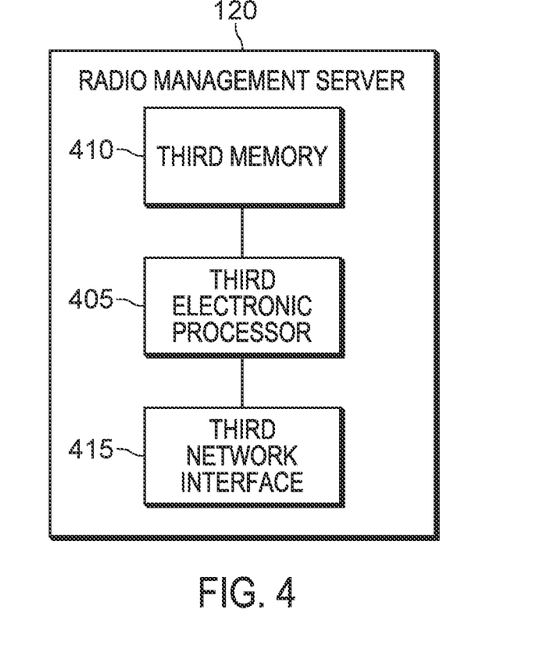
FIG. 4 is a diagram of a radio management server included in the communication system of FIG. 1 according to one example embodiment.

FIG. 4 is a block diagram of the radio management server 120 according to one example embodiment. In the example illustrated, the radio management server 120 is a computer that includes a third electronic processor 405, an input/output interface (not shown), a third memory 410, and a third network interface 415 (for example, including a transceiver and an antenna). These components are similar to those described above with respect to the radio device 105 and perform similar general functions. In some embodiments, the radio management server 120 may include fewer or additional components in configurations different from that illustrated in FIG. 4. For example, in some embodiments, the radio management server 120 also includes a display. In some embodiments, the radio management server 120 performs additional functionality than the functionality described herein. In some embodiments, the radio management server 120 communicates with other devices of the communication system 100 to receive and store information and to control and/or influence operation of other devices as explained in greater detail below.

Figure 5:
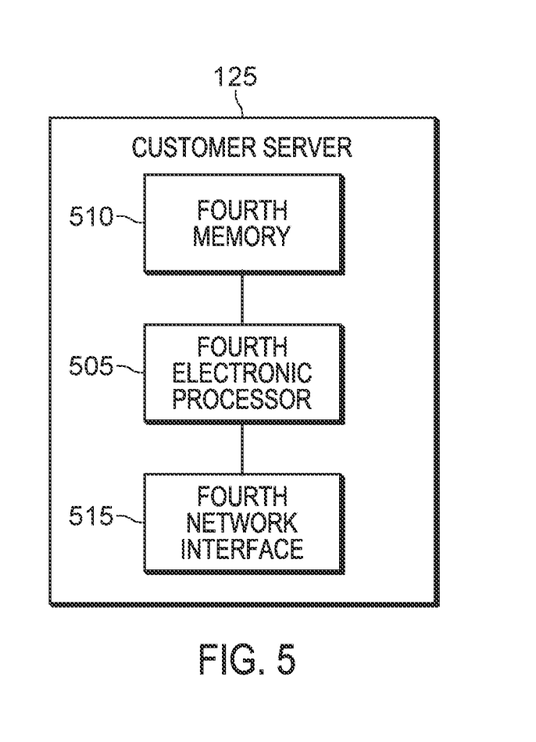
FIG. 5 is a diagram of a customer server included in the communication system of FIG. 1 according to one example embodiment.

FIG. 5 is a block diagram of the customer server 125 according to one example embodiment. In the example illustrated, the customer server 125 is a computer that includes a fourth electronic processor 505, an input/output interface (not shown), a fourth memory 510, and a fourth network interface 515 (for example, including a transceiver and an antenna). These components are similar to those described above with respect to the radio device 105 and perform similar general functions. In some embodiments, the customer server 125 may include fewer or additional components in configurations different from that illustrated in FIG. 5. For example, in some embodiments, the customer server 125 also includes a display. In some embodiments, the customer server 125 performs additional functionality than the functionality described herein. In some embodiments, the customer server 125 communicates with other devices of the communication system 100 to receive and store information and to control and/or influence operation of other devices as explained in greater detail below.

In some embodiments, one or more of the memories 310, 410, 510 store region specific information, for example, regarding software/firmware specifications of radio devices 105. The region specific information may be based on regional regulatory requirements for different regions (e.g., different countries). For example, the regulatory requirements of some countries may only allow radio devices 105 to communicate over specific licensed frequency bands that may be different from licensed frequency bands used by radio devices 105 in other countries. The one or more memories 310, 410, 510 may store software specifications for different licensed frequency bands to be transmitted to radio devices 105 during an activation process. As another example, the regulatory requirements in some countries may prohibit radio devices 105 from communicating using analog communication and may require that radio devices 105 communicate using digital communication. The one or more memories 310, 410, 510 may store analog communication software/firmware specifications and digital communication software/firmware specifications to be transmitted to radio devices 105 during an activation process. As yet another example, the regulatory requirements in some countries may prohibit radio devices 105 from communicating using encryption and may require that communication using radio devices 105 is unencrypted. The one or more memories 310, 410, 510 may store encryption-enabling software/firmware specifications and encryption-disabling software/firmware specifications to be transmitted to radio devices 105 during an activation process. In some embodiments, the region specific information is transmitted to the radio devices 105 when the radio devices 105 are powered-up for the first time by a customer as explained herein.

In some embodiments, one or more of the memories 310, 410, 510 store customer need/preference information regarding software/firmware specifications/configurations of radio devices 105. This customer need/preference information may be similar to the region specific information because the customer need/preference information also relates to software/firmware specifications that may be transmitted to radio devices 105 to control functionality of the radio devices 105. However, the customer need/preference information may be based on customer needs and/or preferences rather than based on regional regulatory requirements. For example, a customer may desire radio devices 105 configured to optionally communicate using two specific types of communication protocols (e.g., LTE and LMR). Continuing this example, one or more of the memories 310, 410, 510 may store software/firmware specifications related to LTE communication and LMR communication to be transmitted to radio devices 105 during an activation process. As another example, a customer may desire to prevent its radio devices 105 from communicating using encryption despite encrypted communication being allowed by the regulatory requirements in the region in which the customer plans to operate the radio devices 105. The one or more memories 310, 410, 510 may store encryption-enabling software/firmware specifications and encryption-disabling software/firmware specifications to be transmitted to radio devices 105 during an activation process. The other examples provided above with respect to regional regulatory requirements may similarly apply to customer need/preference information even if the regulatory requirements do not apply in the region in which the customer plans to operate the radio devices 105. In some embodiments, the customer need/preference information is transmitted to the radio devices 105 when the radio devices 105 are powered-up for the first time by a customer as explained herein.

In some embodiments, one or more of the memories 310, 410, 510 stores region specific information for a plurality of different types of radio devices 105 and customer need/preference information for the plurality of different types of radio devices 105. In some embodiments, the one or more memories 310, 410, 510 provide a central storage location for many different software/firmware specifications/configurations that may be implemented on many different radio devices 105 (e.g., radio devices 105 of the same hardware configuration or radio devices 105 of different hardware configurations). Providing a central storage location for many different software specifications/configurations allows software specifications/configurations to be easily updated (e.g., due to changing regulatory requirements) and/or added (e.g., due to the manufacturer supplying radio devices 105 to a new customer with different needs/preferences or in a new region with different regulatory requirements). This updated/added software specification/configuration information may then be transmitted to radio devices 105, for example, by the radio management server 120 or the customer server 125 (e.g., either direct transmission to the customer server 125 or transmission to the customer server 125 via the radio management server 120). Accordingly, the radio devices 105 may receive updated/added software specifications/configurations without each radio device 105 being taken into a service center to receive such software/firmware specifications/configurations, which may be inconvenient and may cause the radio device 105 to operate less efficiently before it is updated.

Figure 6:
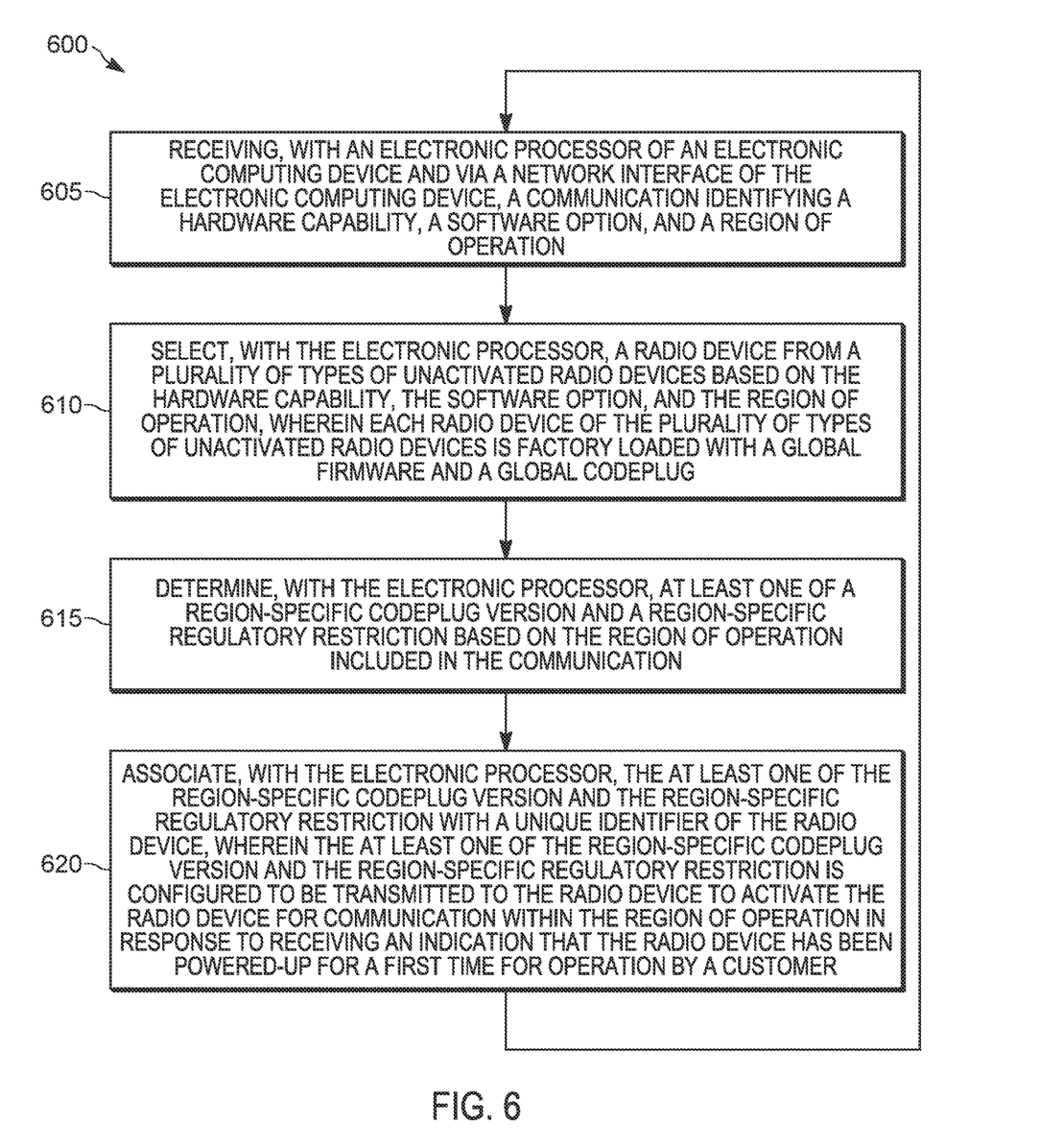
FIG. 6 is a flowchart of a method of activating the radio device of FIG. 2 for customer use that is performed by the order processing device of FIG. 3 according to one example embodiment.

FIG. 6 illustrates a flowchart of a method 600 performed by the second electronic processor 305 of the order processing device 110 (i.e., electronic computing device 110) to facilitate activation of a radio device 105 (i.e., edge-based activation of the radio device 105). While a particular order of processing steps, message receptions, and/or message transmissions is indicated in FIG. 6 as an example, timing and ordering of such steps, receptions, and transmissions may vary where appropriate without negating the purpose and advantages of the examples set forth in detail throughout the remainder of this disclosure.

At block 605, the second electronic processor 305 receives a communication (i.e., an order from a customer) identifying a hardware capability, a software option, and a region of operation. As explained previously herein, the order processing device 110 may receive the order via a user input from an employee of the radio device manufacturer (e.g., via a keyboard, mouse, touchscreen, or the like) that received the order from an employee of the customer. As another example, the order processing device 110 may receive an order by communicating with the customer communication device 115 over a communication network such as the communication network described previously herein.

In some embodiments, the hardware capability included in the order identifies one or more hardware components that are to be included in a radio device 105 that the customer desires to purchase/acquire. For example, the hardware capability may indicate that the radio device 105 should include a camera, a GPS receiver, one or more specific types of integrated circuits that each allow for communication using a certain communication protocol, and the like. In some embodiments, the hardware capability included in the order identifies a certain type (i.e., a certain SKU) of a plurality of types of radio devices 105 that each include a pre-packaged combination of hardware components.

In some embodiments, the software option included in the order identifies one or more software specifications/configurations to be programmed into a radio device 105 that the customer desires to purchase/acquire. In some embodiments, the software option(s) includes the customer need/preference information explained previously herein (e.g., encrypted communication preferences, analog/digital communication preferences, frequency band preferences, and the like).

In some embodiments, the region of operation included in the order identifies a region (e.g., a country) in which the customer is located or in which the customer intends to use a radio device 105 that the customer desires to purchase/acquire.

At block 610, the second electronic processor 305 selects a radio device 105 from a plurality of types of unactivated radio devices 105 based on the hardware capability, the software option, and the region of operation included in the communication (i.e., order). In some embodiments, each type of unactivated radio device of the plurality of types of unactivated radio devices is associated with a SKU. In some embodiments, each radio device 105 of the plurality of types of unactivated radio devices 105 is factory loaded with a global firmware and a global codeplug. In other words, regardless of the type of radio device 105 (i.e., regardless of hardware components, software options, and intended region of operation and regardless of SKU), the first memories 210 of each unactivated radio device 105 may be programmed to include the global firmware and the global codeplug during the manufacturing process.

In some embodiments, the global firmware and the global codeplug allow an unactivated radio device to engage in limited communications to initiate an activation process for the radio device 105. For example, the global firmware and the global codeplug prevent the radio device 105 from communicating with any other devices except the radio management server 120 and/or the customer server 125 to facilitate the activation process. In some embodiments, the global firmware and the global codeplug instruct the first electronic processor 205 to interface with a mobile application programming interface (API) to transmit an indication that the radio device 105 has been powered-up for a first time for operation by the customer (see block 710 of FIG. 7). This indication may be transmitted to at least one of the customer server 125 and the radio management server 120 in response to the radio device 105 being powered-up for the first time for operation by the customer. While the global firmware and the global codeplug allow the same or similar limited communications for each different type of radio device 105, the specific global firmware and global codeplug included in different types of radio devices 105 may be different to be compatible with different hardware components of the different types of radio devices 105 (e.g., integrated circuits for different communication protocols).

In some embodiments, the radio device 105 is configured to transmit, to a first server and via its network interface that includes the transceiver 215, an indication that the radio device 105 has been powered-up for a first time for operation by a customer. In some embodiments, the first server may be a global cloud based server. In some embodiments, the radio device 105 is configured to receive, from the first server and via the network interface, an address of a second server. The second server may include a region-specific codeplug having region-specific regulatory restrictions embedded therein. In some embodiments, the second server is a regional cloud based server. In some embodiments, the radio device 105 is configured to transmit, to the second server and via the network interface, a connection request to obtain the region-specific codeplug having the region-specific regulatory restrictions embedded therein. In response to receiving the region-specific codeplug from the second server via the network interface, the radio device 105 may be configured to activate the radio device 105 for communication using the region-specific codeplug having the region-specific regulatory restrictions embedded therein. For example, activation of the radio device 105 may allow the radio device 105 to generally communicate (i.e., no longer engaging in only limited communications) within a specified region according to, for example, the region-specific regulatory restrictions embedded in the region-specific code plug.

With respect to the second electronic processor 305 selecting a certain radio device 105 based on the hardware capability, the software option, and the region of operation, the second electronic processor 305 may select a type of radio device 105 that meets the hardware capability, the software option, and the region of operation. For example, the second memory 310 may include a look-up table that includes a list of the plurality of types of unactivated radio devices 105 (each with a different SKU) as well as corresponding hardware capabilities, software options, and regions of operation for each type of unactivated radio device. In some embodiments, the second electronic processor 305 may store and/or retrieve hardware capabilities and software options that correspond to the region of operation. For example, the second electronic processor 305 may retrieve one or more hardware capabilities and/or software option(s) from a database of regulatory requirements maintained by a government or other entity associated with the region of operation. The second electronic processor 305 may then select a specific type of unactivated radio device 105 that meets the retrieved hardware capabilities and/or the retrieved software option(s).

In some embodiments, the order (e.g., from a customer) includes a specific requested type of unactivated radio device 105 (i.e., a specific SKU). In such embodiments, the second electronic processor 305 selects the specific requested type of unactivated radio device included in the order. In some embodiments, the second electronic processor 305 selects a specific type of unactivated radio device 105 in response to receiving a user input, for example, from an employee of the manufacturer operating the order processing device 110. For example, after obtaining information from a customer, the employee may determine a specific type of radio device 105 from the plurality of types of radio devices 105 and request, via user input, that the order processing device 110 select a radio device 105 the specific type.

At block 615, the second electronic processor 305 determines at least one of a region-specific codeplug version and a region-specific regulatory restriction based on the region of operation included in the communication (i.e., the order from the customer). The second electronic processor 305 may determine the at least one of the region-specific codeplug version and the region-specific regulatory restriction in a similar manner as the second electronic processor 305 selects the radio device 105 based on the region of operation as described previously herein with respect to block 610. For example, the second memory 310 may include a look-up table that includes a list of regions of operation as well as corresponding region-specific codeplug versions and the region-specific regulatory restrictions (i.e., software specifications/configurations) that are allowed in each region of operation. In some embodiments, the second electronic processor 305 may retrieve region-specific codeplug versions and the region-specific regulatory restrictions (i.e., software specifications/configurations) that are allowed the region of operation included in the order. For example, the second electronic processor 305 may retrieve an indication of one or more region-specific codeplug versions and the region-specific regulatory restrictions (i.e., software specifications/configurations) that are allowed in the region of operation from a database of regulatory requirements maintained by a government or other entity associated with the region of operation.

In some embodiments, the region-specific codeplug versions and the region-specific regulatory restrictions (i.e., software/firmware specifications/configurations) allow the radio device 105 to engage in full communications beyond the limited communications allowed by the global firmware and global codeplug. For example, when received and stored by the radio device 105, the region-specific codeplug versions and the region-specific regulatory restrictions activate the radio device 105 to communicate with other devices (e.g., other radio devices 105) in the region of operation. As explained previously herein with respect to the software specifications/configurations (i.e., region-specific codeplug versions and the region-specific regulatory restrictions), the at least one of the region-specific codeplug version and the region-specific regulatory restriction includes at least one of a frequency band to be used by the radio device 105 for wireless communication, an indication whether encrypted communication is enabled, and a type of communication that is allowed to be used by the radio device 105 (e.g., analog/digital communication requirements). Also as explained previously herein, the region-specific codeplug versions and the region-specific regulatory restrictions may be stored in one or more of the memories 310, 410, 510 of the order processing device 110, the radio management server 120, and the customer server 125.

At block 620, the second electronic processor 305 associates the determined at least one of the region-specific codeplug version and the region-specific regulatory restriction with a unique identifier of the selected radio device 105. For example, the second electronic processor 305 stores an indication, for example in the second memory 310, that the selected radio device 105 should be activated using the determined at least one of the region-specific codeplug version and the region-specific regulatory restriction. In some embodiments, along with this indication, the second electronic processor 305 may also store the at least one of the region-specific codeplug version and the region-specific regulatory restriction (i.e., actual software specifications/configurations to be transmitted to the radio device 105 during the activation process).

As explained previously herein and as explained in greater detail below with respect to FIG. 7, the at least one of the region-specific codeplug version and the region-specific regulatory restriction is configured to be transmitted to the radio device 105 to activate the radio device 105 for communication within the region of operation in response to receiving an indication that the radio device 105 has been powered-up for a first time for operation by a customer.

Figure 7:
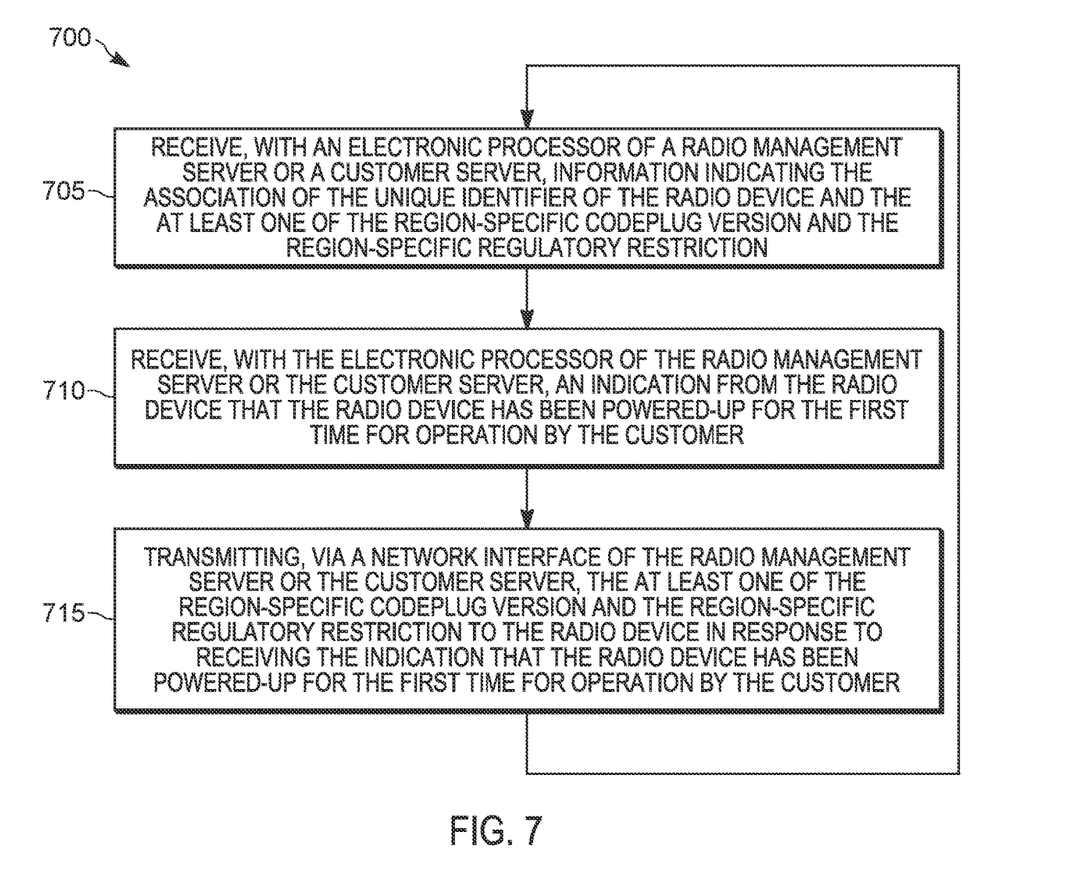
FIG. 7 is a flowchart of a method of activating the radio device of FIG. 2 for customer use that is performed by the radio management server of FIG. 4 or the customer server of FIG. 5 according to one example embodiment.

FIG. 7 illustrates a flowchart of a method 700 performed by the third electronic processor 405 of the radio management server 120 or by the fourth electronic processor 505 of the customer server 125 to facilitate activation of a radio device 105 (i.e., edge-based activation of the radio device 105). As explained previously herein, in some embodiments, the radio management server 120 and the order processing device 110 may be integrated into a single device or may be considered a single electronic computing device with distributed components. In such embodiments, the same electronic computing device may perform both methods 600 and 700. While a particular order of processing steps, message receptions, and/or message transmissions is indicated in FIG. 7 as an example, timing and ordering of such steps, receptions, and transmissions may vary where appropriate without negating the purpose and advantages of the examples set forth in detail throughout the remainder of this disclosure.

At block 705, the third electronic processor 405 or the fourth electronic processor 505 receives information associating/linking a unique identifier of the radio device 105 selected at block 610 of FIG. 6 with the at least one of the region-specific codeplug version and the region-specific regulatory restriction determined at block 615 of FIG. 6. For example, the order processing device 110 transmits the information associating/linking the unique identifier of the selected radio device 105 with the determined at least one of the region-specific codeplug version and the region-specific regulatory restriction to the radio management server 120 or the customer server 125. In some embodiments, the order processing device 110 may merely transmit the indication including an identifier of the determined at least one of the region-specific codeplug version and the region-specific regulatory restriction. In such embodiments, the memories 410, 510 of the radio management server 120 or the customer server 125 may include the at least one of the region-specific codeplug version and the region-specific regulatory restriction and may identify the correct software/firmware specification/configuration information based on the identifier of the determined at least one of the region-specific codeplug version and the region-specific regulatory restriction. In other embodiments, the radio management server 120 or the customer server 125 may also receive the region-specific codeplug version and the region-specific regulatory restriction (i.e., software/firmware specification/configuration information) from the order processing device 110.

In some embodiments where the order processing device 110 transmits the association/linking information to the customer server 125, the second electronic processor 305 of the order processing device 110 may identify the customer based on the communication (i.e., the order from the customer) and select the customer server 125 corresponding to the identified customer. Similarly, the second electronic processor 305 may identify a specific radio management server 120 serving the identified customer and to which the association/linking information should be transmitted.

In some embodiments, the electronic processor 405, 505 may store the received information linking the unique identifier of the radio device 105 with the at least one of the region-specific codeplug version and the region-specific regulatory restriction in the memory 410, 510 for future use when the radio management server 120 or the customer server 125 receives a communication from the radio device 105 corresponding to the received unique identifier (e.g., in response to the radio device being powered-up for the first time by a customer). In some embodiments, the radio management server 120 or the customer server 125 may receive the information linking the unique identifier of the radio device 105 with the at least one of the region-specific codeplug version and the region-specific regulatory restriction during the manufacturing process of the radio device 105 (i.e., before the radio device 105 has been shipped/provided to the customer).

At block 710, the electronic processor 405, 505 receives, via the network interface 415, 515, an indication that the radio device 105 has been powered-up for a first time for operation by a customer. For example, the radio device 105 has been shipped/provided to the customer and the customer has powered-up the radio device 105 (i.e., turned on the radio device 105) for the first time. As explained previously herein, the global firmware and the global codeplug included in the first memory 210 of the radio device 105 instruct the first electronic processor 205 to interface with a mobile application programming interface (API) to transmit an indication that the radio device 105 has been powered-up for a first time for operation by the customer to at least one of the customer server 125 and the radio management server 120 in response to the radio device 105 being powered-up for the first time for operation by the customer. At this point the radio device 105 remains unactivated for typical communication because the radio device 105 has not yet received the at least one of the region-specific codeplug version and the region-specific regulatory restriction. In other words, prior to receiving the at least one of the region-specific codeplug version and the region-specific regulatory restriction, the radio device 105 is configured to be unable to transmit data or receive data other than data communicated for facilitating receipt of the at least one of the region-specific codeplug version and the region-specific regulatory restriction to activate the radio device 105 for communication within the region of operation.

Such limited communication capabilities of the radio device 105 prevents misuse of radio devices 105, for example, in an unintended region of operation. For example, previous radio devices 105 may locally store activation information for a plurality of regions of operation where the activation information may be selected by a user and may therefore allow the radio device 105 to be used in an unintended region of operation. On the other hand, when the radio device 105 disclosed herein is factory reset or unactivated upon initial shipment to the customer, it may only communicate with the radio management server 120 or the customer server 125 to receive the at least one of the region-specific codeplug version and the region-specific regulatory restriction to activate the radio device 105 for communication within a specified region of operation.

As another advantage of the disclosed systems and methods, the limited communication capabilities of the radio device 105 before it is activated allows for similar radio devices 105 to be priced differently in different regions because the region of operation of each radio device 105 is set and controlled from a central location (i.e., order processing device 110, the radio management server 120, and/or the customer server 125).

At block 715, in response to receiving the indication that the radio device 105 has been powered-up for the first time for operation by the customer, the electronic processor 405, 505 activates the radio device 105 for communication within the region of operation by transmitting, via the first network interface (i.e., the combination of the first transceiver 215 and the antenna 216), the at least one of the region-specific codeplug version and the region-specific regulatory restriction to the radio device 105. In some embodiments, the indication from the radio device 105 indicates the unique identifier of the radio device 105. The electronic processor 405, 505 may use the unique identifier of the radio device 105 to look up associated/linked at least one of a region-specific codeplug version and a region-specific regulatory restriction for transmitting to the radio device 105. The radio device 105 may store the at least one of the region-specific codeplug version and the region-specific regulatory restriction and operate according to the at least one of the region-specific codeplug version and the region-specific regulatory restriction in order to activate itself for normal use by the customer (i.e., to be able to communicate with other radio devices 105).

In some embodiments, additional information used to activate the radio device 105 may also be transmitted by the radio management server 120 or the customer server 125 to the radio device 105. For example, the electronic processor 405, 505 is configured to associate the unique identifier of the radio device 105 with a public key infrastructure (PKI) certificate that is transmitted to the radio device 105, via the network interface 415, 515 in response to receiving a request for the PKI certificate from the radio device 105. In some embodiments, this provisioning of the radio device 105 with the PKI certificate is completed by another device in the communication system 100 (e.g., a separate PKI server). Other information used by the radio device 105 during its activation process (i.e., edge-based activation process) may be provided by one or more devices of the communication system 100 after or in response to in response to receiving the indication that the radio device 105 has been powered-up for the first time for operation by the customer.

On a related note, in some embodiments, the radio management server 120 or the customer server 125 may provide user-configurable configuration settings to the radio device 105 in response to receiving the indication that the radio device 105 has been powered-up for the first time for operation by the customer. Accordingly, the customer may be able to choose their configuration settings (e.g., audio profile settings, button functionality settings, contacts, time zones, and the like) before receiving the radio device 105. For example, the communication (i.e., order from the customer) is received from the customer communication device 115 and may include customer-selected configuration settings of the radio device 105. As another example, the customer-selected configuration settings may be selected via the customer communication device 115 and transmitted to the radio management server 120 or the customer server 125 (e.g., via the order processing device 110) at any point in time during the manufacturing process or before the customer receives the radio device 105. The electronic processor 305, 405, 505 may be configured to associate the customer-selected configuration settings with the unique identifier of the radio device 105 such that the customer-selected configuration settings are configured to be transmitted to the radio device 105 (e.g., by the radio management server 120 or the customer server 125) in response to receiving the indication that the radio device 105 has been powered-up for the first time for operation by the customer.

By pushing customer-selected configuration settings to the radio device 105 during edge-based activation, user experience is improved. For example, the customer need not take time to enter at least some configuration settings into the radio device 105 upon receipt of the radio device 105. Additionally, for customers ordering a large number of radio devices 105 that are each to be configured with the same configuration settings (e.g., a public safety agency ordering radio devices 105 to be used by each public safety officer), the customer need not individually enter the same configuration settings into each radio device 105.

In some embodiments, during the manufacturing process and before the radio device 105 is shipped/provided to the customer, the second electronic processor 305 is configured to transmit, via the network interface 315 to the distribution center 130, information indicating the association/linking of the unique identifier of the radio device 105 and the at least one of the region-specific codeplug version and the region-specific regulatory restriction. For example, the distribution center 130 may include a communication device configured to wirelessly receive this information from the order processing device 110. Based on this received information from the order processing device 110, a physical label including at least some information indicating the at least one of the region-specific codeplug version and the region-specific regulatory restriction may be secured to the radio device 105 before the radio device 105 is shipped/provided to the customer. Thus, before this physical label is secured to the radio device 105, the radio device 105 may be used to fulfill different orders in different regions that include different software specifications/configurations as long as the radio device 105 includes the required hardware components.

In some embodiments, configuring the at least one of the region-specific codeplug version and the region-specific regulatory restriction to be transmitted to the radio device 105 to activate the radio device 105 for communication within the region of operation in response to receiving the indication that the radio device 105 has been powered-up for the first time for operation by the customer (i.e., in accordance with the methods 600 and 700 described herein) allows for an amount of stock-keeping units (SKUs) each associated with one type of unactivated radio device 105 of the plurality of types of unactivated radio devices 105 to be reduced compared to configuring the at least one of the region-specific codeplug version and the region-specific regulatory restriction to be stored on the radio device 105 before the radio device 105 has been powered-up for the first time for operation by the customer. For example, each combination of hardware components and software components no longer needs a separate SKU. Rather, separate SKUs may merely be used for each type of radio device 105 with different hardware components while desired software/firmware components (e.g., software specifications/configurations) may be transmitted to each radio device 105 for activation of the radio device 105, for example, in response to the radio device 105 being powered-up for a first time for operation by the customer.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic computing device configured to facilitate activation of a radio device, the electronic computing device comprising:
   a network interface; and
   an electronic processor coupled to the network interface, and configured to
      receive a communication identifying a hardware capability, a software option, and a region of operation,
      select the radio device from a plurality of types of unactivated radio devices based on the hardware capability, the software option, and the region of operation, wherein each radio device of the plurality of types of unactivated radio devices is factory loaded with a global firmware and a global codeplug,
      determine at least one of a region-specific codeplug version and a region-specific regulatory restriction based on the region of operation included in the communication, and
      associate the at least one of the region-specific codeplug version and the region-specific regulatory restriction with a unique identifier of the radio device,
   wherein the at least one of the region-specific codeplug version and the region-specific regulatory restriction is configured to be transmitted to the radio device to activate the radio device for communication within the region of operation in response to receiving an indication that the radio device has been powered-up for a first time for operation by a customer.

2. The electronic computing device of claim 1, wherein the electronic processor is configured to transmit, via the network interface to a radio management server, information indicating the association of the unique identifier of the radio device and the at least one of the region-specific codeplug version and the region-specific regulatory restriction;
wherein the at least one of the region-specific codeplug version and the region-specific regulatory restriction is configured to be transmitted to the radio device by the radio management server in response to the radio management server receiving the indication that the radio device has been powered-up for the first time for operation by the customer.

3. The electronic computing device of claim 1, wherein the electronic processor is configured to:
identify the customer based on the communication; and
transmit, via the network interface to a customer server owned by the customer, information indicating the association of the unique identifier of the radio device and the at least one of the region-specific codeplug version and the region-specific regulatory restriction;
wherein the at least one of the region-specific codeplug version and the region-specific regulatory restriction is configured to be transmitted to the radio device by the customer server in response to the customer server receiving the indication that the radio device has been powered-up for the first time for operation by the customer.

4. The electronic computing device of claim 1, wherein the global firmware and the global codeplug of the radio device are configured to instruct the radio device to interface with a mobile application programming interface (API) to transmit the indication that the radio device has been powered-up for the first time for operation by the customer to at least one of a customer server owned by the customer and a radio management server in response to the radio device being powered-up for the first time for operation by the customer.

5. The electronic computing device of claim 1, wherein prior to receiving the at least one of the region-specific codeplug version and the region-specific regulatory restriction, the radio device is configured to be unable to transmit data or receive data other than data communicated for facilitating receipt of the at least one of the region-specific codeplug version and the region-specific regulatory restriction to activate the radio device for communication within the region of operation.

6. The electronic computing device of claim 1, wherein the electronic processor is configured to associate the unique identifier of the radio device with a public key infrastructure (PKI) certificate;
wherein the PKI certificate is configured to be transmitted to the radio device in response to receiving a request for the PKI certificate from the radio device.

7. The electronic computing device of claim 1, wherein the electronic processor is configured to transmit, via the network interface to a distribution center, information indicating the association of the unique identifier of the radio device and the at least one of the region-specific codeplug version and the region-specific regulatory restriction;
wherein a physical label including at least some information indicating the at least one of the region-specific codeplug version and the region-specific regulatory restriction is secured to the radio device.

8. The electronic computing device of claim 1, wherein the at least one of the region-specific codeplug version and the region-specific regulatory restriction includes at least one of a frequency band to be used by the radio device for wireless communication, an indication whether encrypted communication is enabled, and a type of communication that is allowed to be used by the radio device.

9. The electronic computing device of claim 1, wherein the electronic processor is configured to receive the communication from a customer communication device;
wherein the electronic processor is configured to receive, from the customer communication device, customer-selected configuration settings of the radio device;
wherein the electronic processor is configured to associate the customer-selected configuration settings with the unique identifier of the radio device; and
wherein the customer-selected configuration settings are configured to be transmitted to the radio device in response to receiving the indication that the radio device has been powered-up for the first time for operation by the customer.

10. The electronic computing device of claim 1, wherein configuring the at least one of the region-specific codeplug version and the region-specific regulatory restriction to be transmitted to the radio device to activate the radio device for communication within the region of operation in response to receiving the indication that the radio device has been powered-up for the first time for operation by the customer allows for an amount of stock-keeping units (SKUs) each associated with one type of unactivated radio device of the plurality of types of unactivated radio devices to be reduced compared to configuring the at least one of the region-specific codeplug version and the region-specific regulatory restriction to be stored on the radio device before the radio device has been powered-up for the first time for operation by the customer.

11. A method of activating a radio device for customer use, the method comprising:
receiving, with an electronic processor of an electronic computing device and via a network interface of the electronic computing device, a communication identifying a hardware capability, a software option, and a region of operation;
selecting, with the electronic processor, the radio device from a plurality of types of unactivated radio devices based on the hardware capability, the software option, and the region of operation, wherein each radio device of the plurality of types of unactivated radio devices is factory loaded with a global firmware and a global codeplug;
determining, with the electronic processor, at least one of a region-specific codeplug version and a region-specific regulatory restriction based on the region of operation included in the communication; and
associating, with the electronic processor, the at least one of the region-specific codeplug version and the region-specific regulatory restriction with a unique identifier of the radio device, the at least one of the region-specific codeplug version and the region-specific regulatory restriction being configured to be transmitted to the radio device to activate the radio device for communication within the region of operation in response to receiving an indication that the radio device has been powered-up for a first time for operation by a customer.

12. The method of claim 11, further comprising transmitting, with the electronic processor and via the network interface to a radio management server, information indicating the association of the unique identifier of the radio device and the at least one of the region-specific codeplug version and the region-specific regulatory restriction, the at least one of the region-specific codeplug version and the region-specific regulatory restriction being configured to be transmitted to the radio device by the radio management server in response to the radio management server receiving the indication that the radio device has been powered-up for the first time for operation by the customer.

13. The method of claim 11, further comprising:
identifying, with the electronic processor, the customer based on the communication; and
transmitting, via the network interface to a customer server owned by the customer, information indicating the association of the unique identifier of the radio device and the at least one of the region-specific codeplug version and the region-specific regulatory restriction, the at least one of the region-specific codeplug version and the region-specific regulatory restriction being configured to be transmitted to the radio device by the customer server in response to the customer server receiving the indication that the radio device has been powered-up for the first time for operation by the customer.

14. The method of claim 11, further comprising instructing, with a second electronic processor of the radio device and based on the global firmware and the global codeplug of the radio device, to interface with a mobile application programming interface (API) to transmit the indication that the radio device has been powered-up for the first time for operation by the customer to at least one of a customer server owned by the customer and a radio management server in response to the radio device being powered-up for the first time for operation by the customer.

15. The method of claim 11, wherein prior to receiving the at least one of the region-specific codeplug version and the region-specific regulatory restriction, preventing the radio device from transmitting data or receiving data other than data communicated for facilitating receipt of the at least one of the region-specific codeplug version and the region-specific regulatory restriction to activate the radio device for communication within the region of operation.

16. The method of claim 11, further comprising transmitting, via the network interface to a distribution center, information indicating the association of the unique identifier of the radio device and the at least one of the region-specific codeplug version and the region-specific regulatory restriction; and
securing a physical label including at least some information indicating the at least one of the region-specific codeplug version and the region-specific regulatory restriction to the radio device.

17. The method of claim 11, wherein the at least one of the region-specific codeplug version and the region-specific regulatory restriction includes at least one of a frequency band to be used by the radio device for wireless communication, an indication whether encrypted communication is enabled, and a type of communication that is allowed to be used by the radio device.

18. The method of claim 11, wherein receiving the communication including receiving the communication from a customer communication device, and further comprising:
receiving, with the electronic processor and from the customer communication device, customer-selected configuration settings of the radio device; and
associating, with the electronic processor, the customer-selected configuration settings with the unique identifier of the radio device, the customer-selected configuration settings being configured to be transmitted to the radio device in response to receiving the indication that the radio device has been powered-up for the first time for operation by the customer.

19. The method of claim 11, wherein configuring the at least one of the region-specific codeplug version and the region-specific regulatory restriction to be transmitted to the radio device to activate the radio device for communication within the region of operation in response to receiving the indication that the radio device has been powered-up for the first time for operation by the customer allows for an amount of stock-keeping units (SKUs) each associated with one type of unactivated radio device of the plurality of types of unactivated radio devices to be reduced compared to configuring the at least one of the region-specific codeplug version and the region-specific regulatory restriction to be stored on the radio device before the radio device has been powered-up for the first time for operation by the customer.

20. A radio device activation system comprising:
a radio management server including a first electronic processor and a first network interface; and
an electronic computing device communicatively coupled to the radio management server, and including a second electronic processor and a second network interface, wherein the second electronic processor is configured to
receive a communication identifying a hardware capability, a software option, and a region of operation,
select a radio device from a plurality of types of unactivated radio devices based on the hardware capability, the software option, and the region of operation, wherein each radio device of the plurality of types of unactivated radio devices is factory loaded with a global firmware and a global codeplug,
determine at least one of a region-specific codeplug version and a region-specific regulatory restriction based on the region of operation included in the communication, and
transmit, via the second network interface to the radio management server, information linking a unique identifier of the radio device with the at least one of the region-specific codeplug version and the region-specific regulatory restriction;
wherein the first electronic processor of the radio management server is configured to
receive, via the first network interface and from the electronic computing device, the information linking the unique identifier of the radio device with the at least one of the region-specific codeplug version and the region-specific regulatory restriction,
receive, via the first network interface and from the radio device, an indication that the radio device has been powered-up for a first time for operation by a customer, and
in response to receiving the indication that the radio device has been powered-up for the first time for operation by the customer, activate the radio device for communication within the region of operation by transmitting, via the first network interface, the at least one of the region-specific codeplug version and the region-specific regulatory restriction to the radio device.

* * * * *